United States Patent
Linden

(10) Patent No.: US 7,389,562 B2
(45) Date of Patent: Jun. 24, 2008

(54) WINDSHIELD WIPER ASSEMBLY WITH TUBULAR FRAME MEMBER

(75) Inventor: Philip S. Linden, Valparaiso, IN (US)

(73) Assignee: Sprague Devices, Inc., Michigan City, IN (US)

( * ) Notice: Subject to any disclaimer, the term of this patent is extended or adjusted under 35 U.S.C. 154(b) by 728 days.

(21) Appl. No.: 10/771,894

(22) Filed: Feb. 4, 2004

(65) Prior Publication Data

US 2004/0244134 A1 Dec. 9, 2004

Related U.S. Application Data

(60) Provisional application No. 60/444,921, filed on Feb. 4, 2003.

(51) Int. Cl.
*B60S 1/06* (2006.01)
*B60S 1/04* (2006.01)

(52) U.S. Cl. .................................. 15/250.31; 15/250.3

(58) Field of Classification Search .............. 15/250.3, 15/250.31, 250.27; 296/96.17, 96, 96.15; 74/42, 43
See application file for complete search history.

(56) References Cited

U.S. PATENT DOCUMENTS

| | | | | | |
|---|---|---|---|---|---|
| 3,046,040 | A | * | 7/1962 | Luper | 403/388 |
| 4,249,716 | A | * | 2/1981 | Barron | 251/146 |
| 4,736,486 | A | | 4/1988 | Beneteau et al. | |
| 5,222,706 | A | * | 6/1993 | Hoshino | 248/200 |
| 5,261,286 | A | * | 11/1993 | Hayashi | 74/96 |
| 5,396,681 | A | * | 3/1995 | Hara | 15/250.31 |
| 5,441,227 | A | * | 8/1995 | Hayashi | 248/274.1 |
| 5,536,100 | A | | 7/1996 | Kiefer | |
| 5,647,086 | A | * | 7/1997 | Gold | 15/250.31 |
| 5,878,631 | A | * | 3/1999 | Muehlpforte et al. | 74/606 R |
| 6,292,975 | B1 | | 9/2001 | Isii et al. | |

FOREIGN PATENT DOCUMENTS

| | | | |
|---|---|---|---|
| EP | 0689975 | A | 1/1996 |
| EP | 0703128 | A | 3/1996 |
| EP | 0739793 | A | 10/1996 |
| EP | 1266810 | A | 12/2002 |
| FR | 1394313 | A | 4/1965 |
| FR | 2621287 | A | 4/1989 |

OTHER PUBLICATIONS

International Search Report, Jun. 17, 2004, in corresponding international application.

* cited by examiner

*Primary Examiner*—Gary K Graham
(74) *Attorney, Agent, or Firm*—Fitch, Even, Tabin & Flannery

(57) ABSTRACT

A windshield wiper structural assembly and a method of forming the same is disclosed. The structural member is generally comprised of an elongate tubular component, which is bent to the desired configuration. The pivot mechanisms (8, 10) are designed for application to the exterior surface of the tubular component, whereupon they are clamped to the tubular component where they are retained. The clamping is done by wire clips which are crimped around the pivot mechanisms (8, 10). Pins can also be driven through the housings and the tubular component to prevent rotation of the housings.

6 Claims, 5 Drawing Sheets

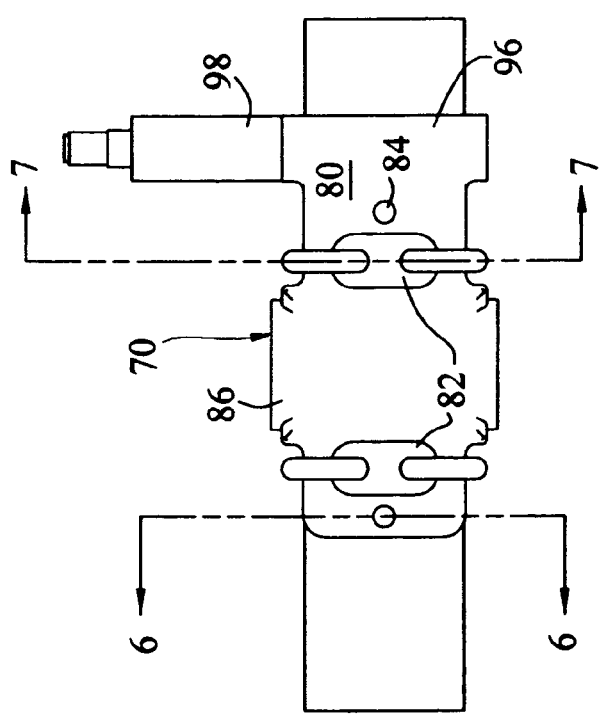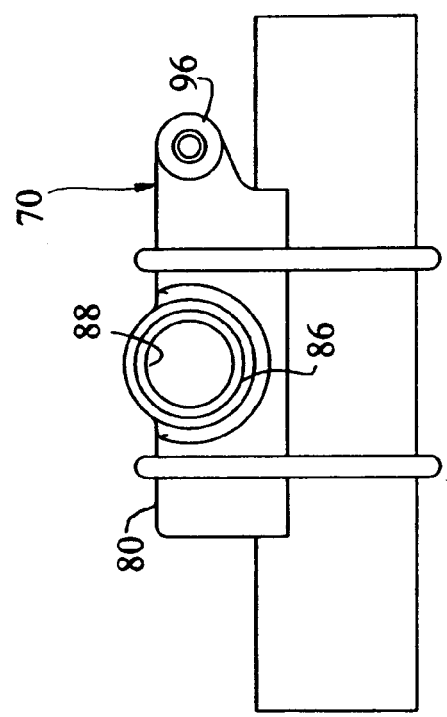

WINDSHIELD WIPER ASSEMBLY WITH TUBULAR FRAME MEMBER

BACKGROUND OF THE INVENTION

This application claims the benefit of U.S. Provisional Patent Application Ser. No. 60/444,921 filed Feb. 4, 2003, the complete disclosure of which is hereby expressly incorporated by reference.

The subject invention relates to windshield wiper assemblies and, in particular, the structural frame, which embodies the drive and pivot mechanism for windshield wiper systems.

SUMMARY OF THE INVENTION

Windshield wiper systems commonly include a structural mechanism, which is mounted to the vehicle, which includes a bracket for mounting an electric motor for driving the windshield wiper system, pivot mounts for pivotally mounting pivot pins for the wiper blade rotation, and a linkage mechanism between the motor and the pivot pins, which drive the blades. Several different systems are available.

One such system includes stamped and formed elongate brackets having mounting feet for mounting to the vehicle, and a pivot mechanism having a bushing or bearing positioned along the length of the bracket, where the wipers should be mounted. A pivot pin will be positioned in the bearing and will be connected to the linkage, which causes the pivotal movement of the wiper blades.

Another assembly is known, which includes a tubular member having mounted at its ends cast or forged pivot mechanisms, whereby the end is substantially cylindrical in cross-section and can be placed in the tubular end and crimped thereto. Each of the castings includes a mounting area for receiving the pivot pin to which the windshield wipers can be connected. Such a device is shown in U.S. Pat. No. 5,536,100.

There are several drawbacks to the design mentioned in U.S. Pat. No. 5,536,100. First, for each different configuration, a different cast member is required, and in fact, a different cast member is required for opposite ends of the same assembly. Also, in the event that four pivot pins are located in the same assembly, then two of the interior pivot pins require a "T-configuration," such that two ends of the cast pivot pin housing are crimped to the tubes. This means that the device can only be placed at ends of the tube. Naturally, the tube could be cut in several locations, and several couplings crimped, however this requires accuracy in location and at the same time damages the structural integrity of the tubular member itself.

It should be also be appreciated that many different configurations of the wiper blade mechanisms are necessary, given the various sizes and configurations of vehicles, particularly trucks, and in fact in some instances, different configurations of the assemblies are required for different options within the exact same vehicle. It should also be appreciated that in some instances, two pivot pins are positioned along the length of the tubular member, and in some cases, four pivot pins are mounted, depending upon the geometry of the wiping pattern, and the size of the windshield to which the assembly applies.

Thus, given the nature of the assembly configuration, the number of wiper blades involved, and the mounting of the assembly, it should be readily apparent that numerous cast pivot pin housings will be required to accommodate the variety of assemblies. Thus, the object of the invention is to improve upon the various assemblies mentioned above.

The objects have been accomplished by providing a windshield wiper assembly, comprising at least one elongate tubular frame member, and a plurality of pivot pin housing members. Each housing member has a flange portion having an open surface for mounting to an exterior surface of the tubular frame member and a pin mounting portion. Retaining means retain the pivot pin housings to the tubular frame member.

Preferably, the open surface is arcuate in cross section to substantially conform to the outside diameter of the elongate tubular frame member. The open surface includes elongate ribs, having an edge for gripping the outer surface of the elongate tubular frame member. The flange portion is generally rectangular in configuration, where the arcuate open surface is configured on an elongate surface of the rectangular shape. The pin mounting portion is configured transversely to the elongate surface of the rectangular shape.

The retaining means is defined by a clamp assembly having at least one clip portion, which surrounds the elongate tubular frame member and the pivot pin housing member, retaining them together. The clamp assembly is comprised of two clip portions, which flank the pin mounting portion, and which circumscribe the combination of the elongate tubular frame member and the pivot pin housing member. The pivot pin housing member, on a face opposite the arcuate open surface, has indentations, and the two clip portions have free ends which are crimped into the indentations. The windshield wiper assembly further comprises piercing pins extending through the flange portion and extends into the elongate tubular frame member. The elongate tubular frame member includes mounting members to mount the assembly. The mounting members are defined by a portion of the elongate tubular member, flattened and formed with an aperture therethrough.

In another form of the invention, a method of forming an automotive wiper assembly, comprises the steps of providing a tubular structural component, providing the tubular structural component with the desired configuration, providing a pivot pin mounting housing having an open mounting face, applying the pivot pin mounting housing to the exterior surface of the tubular structural component, and retaining the pivot pin mounting housing to the tubular structural component.

The retaining step is provided by clamping the pivot pin mounting housing to the tubular structural component. The clamping is provided by wire clips being formed around the exterior of the tube and around the pivot pin mounting housing. The method further comprises the step of forming apertures in the outside face which is opposite the mounting face, and the free ends of the wire clips are crimped into the apertures. The tubular component is provided with a cylindrical cross-section. The method further comprises the step of driving pins through the pivot pin housing, and radially into the tube, to prevent rotation of the pivot pin housing.

Preferably, the tubular component is bent to define the desired configuration. The pivot pin housings are applied to the tubular component distant from the ends of the tube. The free ends of the tube are flattened into mounting flanges and mounting apertures are provided through the flanges.

The invention will now be described with reference to the drawings.

BRIEF DESCRIPTION OF THE DRAWINGS

FIG. 4 is a top plan view of the pivot mechanism of FIG. 3;

FIG. 5 is a side plan view of the pivot mechanism of FIG. 4;

DETAILED DESCRIPTION OF THE INVENTION

Figure 1:
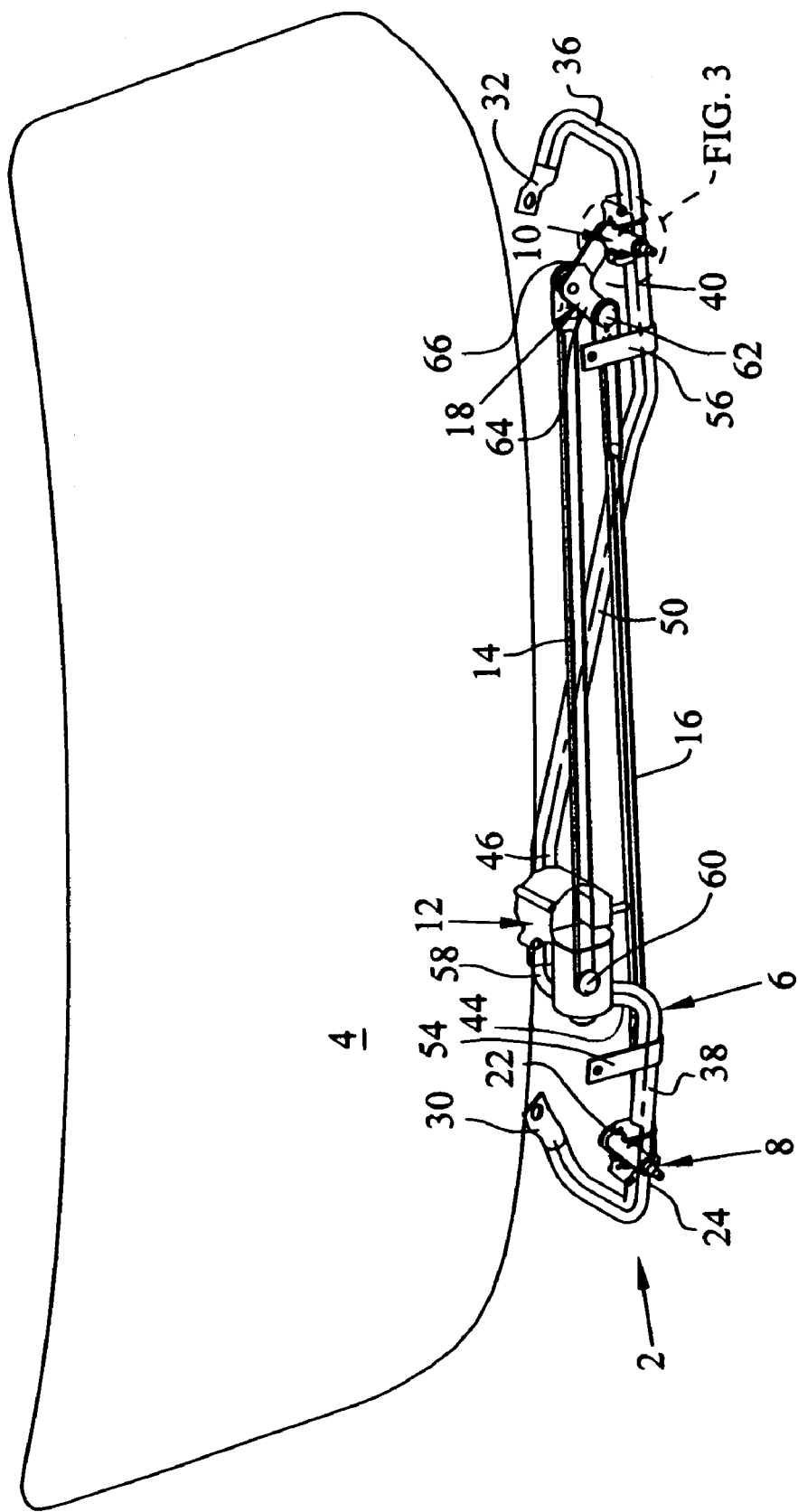
FIG. 1 is a perspective view of the wiper assembly poised relative to a windshield with which it would operate.
Figure 2:
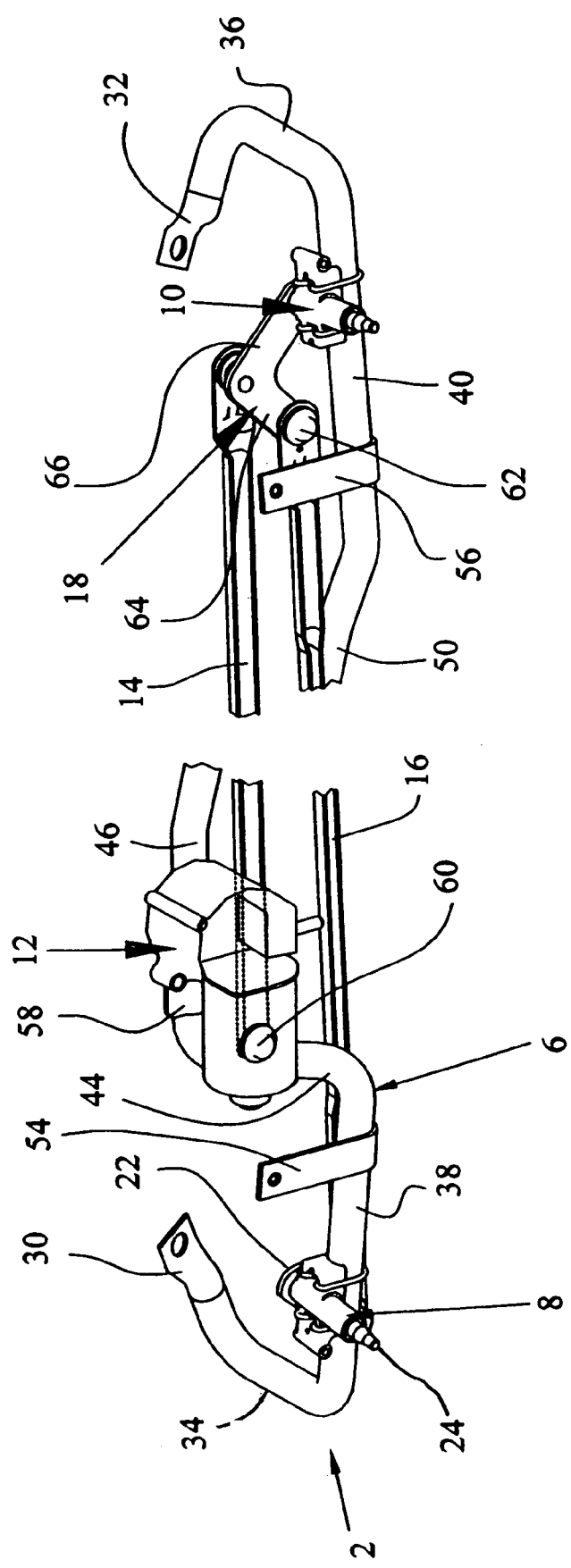
FIG. 2 is an enlarged view of the linkage mechanism.

With reference first to FIG. 1, a linkage mechanism is shown at 2, poised relative to a windshield 4, with which it will cooperate. It should be understood that the linkage 2 would be mounted adjacent to the windshield in a manner well known in the automotive field. With reference to FIGS. 1 and 2, the linkage mechanism is generally comprised of a tubular structural component 6 extending from end to end, with a first pivot mechanism 8 positioned at one end, and a second pivot mechanism 10 positioned at the opposite end. A motor 12 is mounted to the tubular component 6, having a drive connection to linkage 14, which in turn drives linkage 16, through yoke 18. It should be appreciated that motor 12 is configured to cause a reciprocity motion to linkage 14. With respect now to FIGS. 2 and 3, yoke 18 is shown driving pin 20 (FIG. 3), whereas linkage 16 drives a lever 22 which in turn drives pin 24 (FIG. 2).

With reference now to FIG. 2, the various components mentioned above will be described in greater detail. As shown, tubular component 6 is shown having a generally cylindrical cross-section and having a plurality of bends. It should be appreciated that the tubular component could be a stainless steel tube, which can be easily bent, yet which is structurally rigid, and weatherproof. It should also be appreciated that any configuration could be defined, where the various bends are positioned as required to position the wiper blades relative to the windshield, or where the tubular component 6 is required to not interfere with another unrelated component. However, this tubular component will be discussed below, only by way of example to the many ways the tubular component could be manufactured and configured.

With respect to FIG. 2, the tubular component first has flattened end portions 30, 32 having apertures therethrough for mounting purposes. Each end of the tubular component 6 includes a bend 34, 36, which tends to space the assembly away from the windshield to place the wipers in proper position. The tubular component then includes straight sections 38, 40 to which the first and second pivot mechanisms 8, 10 are mounted. The tubular component then includes a generally right angled bend, defined by tubular sections 44, 46, which help provide a position where motor 12 can be mounted, yet position motor 12 and linkage 14 in position with yoke 18. Transition section 50 merely connects the sections 40 and 46 together. It should also be appreciated that other various brackets can be provided, such as auxiliary mounting brackets 54, 56, and motor mounting bracket 58.

Figure 3:
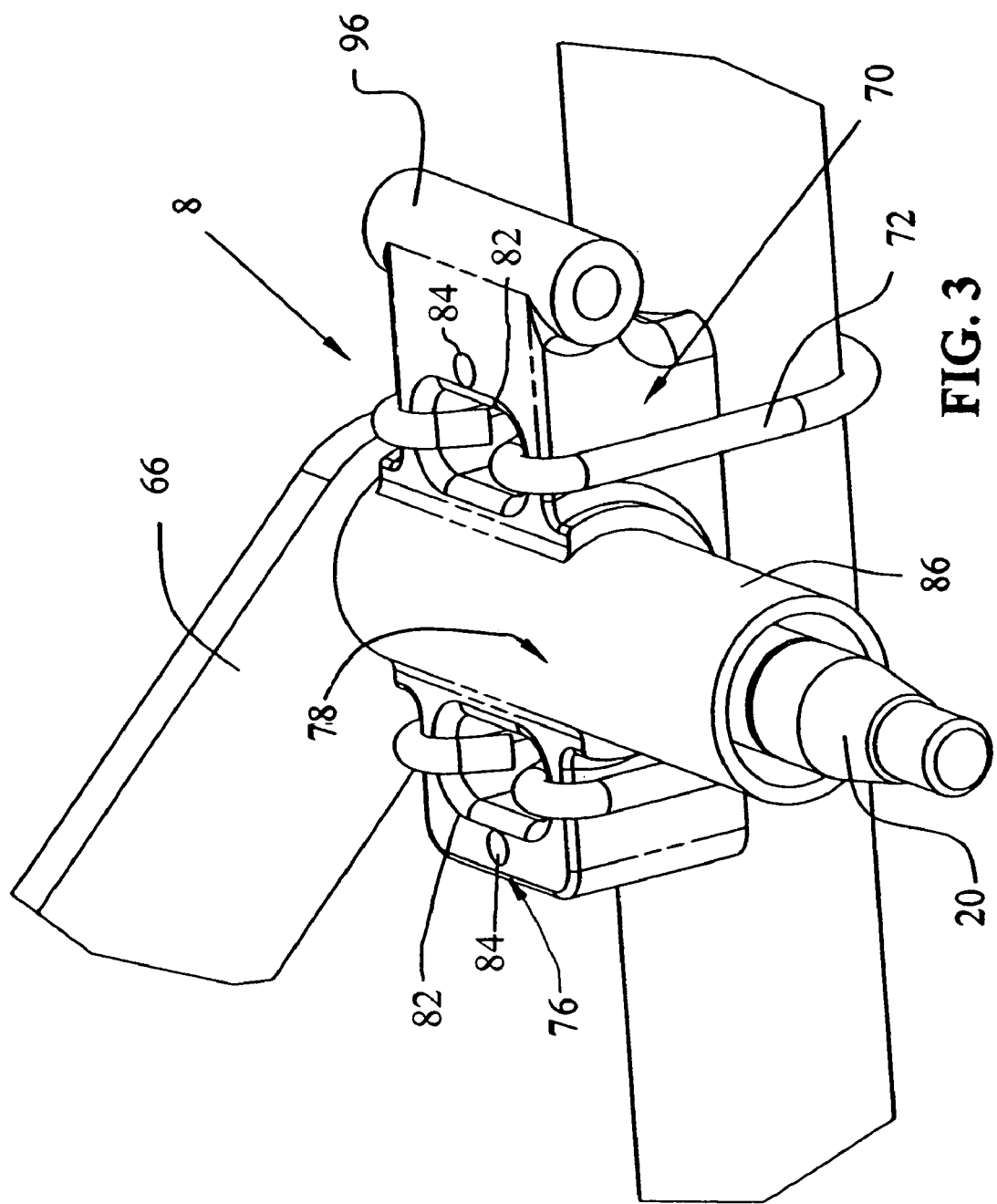
FIG. 3 is an enlargement of the inset shown in FIG. 1, showing a pivot pin mechanism in perspective view.

With respect again to FIG. 2, motor 12 is shown connected to linkage 14 in a known manner, where pin 60 connects motor 12 to linkage 14. At the opposite end, a fastener assembly 62 is provided connecting linkages 14 and 16 to yoke 18. Yoke 18 includes a sleeve portion 64 to receive fastener assembly 62, and a lever portion 66 connected to drive pin 20, as best shown in FIG. 3. It should be appreciated that lever 66 could be connected to pin 20 in any known manner; lever 66 and pin 20 could be integrally cast or forged, they would be welded or press-fit, or they could be splined together. However, their connection is immaterial other than to say that the rotation of lever arm 66 causes a like rotation of pin 20. Likewise, linkage 16 is attached to lever 22, and lever 22 and pin 24 are attached in a manner similar to lever 66, 20, such that translation of linkage 16 causes a rotation of lever arm 22 and rotation of pin 24.

With reference now to FIGS. 3-7, the pivot mechanisms 8, 10 will be described in greater detail. It should be appreciated that these mechanisms are identical and thus only one need be explained in detail. What differs is only their location and the pivot pin, which is mounted therethrough.

Figure 6:
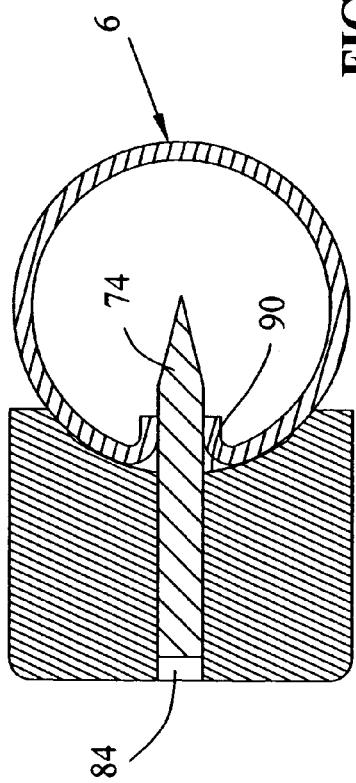
FIG. 6 is a cross-section view through lines 6-6 of FIG. 4.
Figure 7:
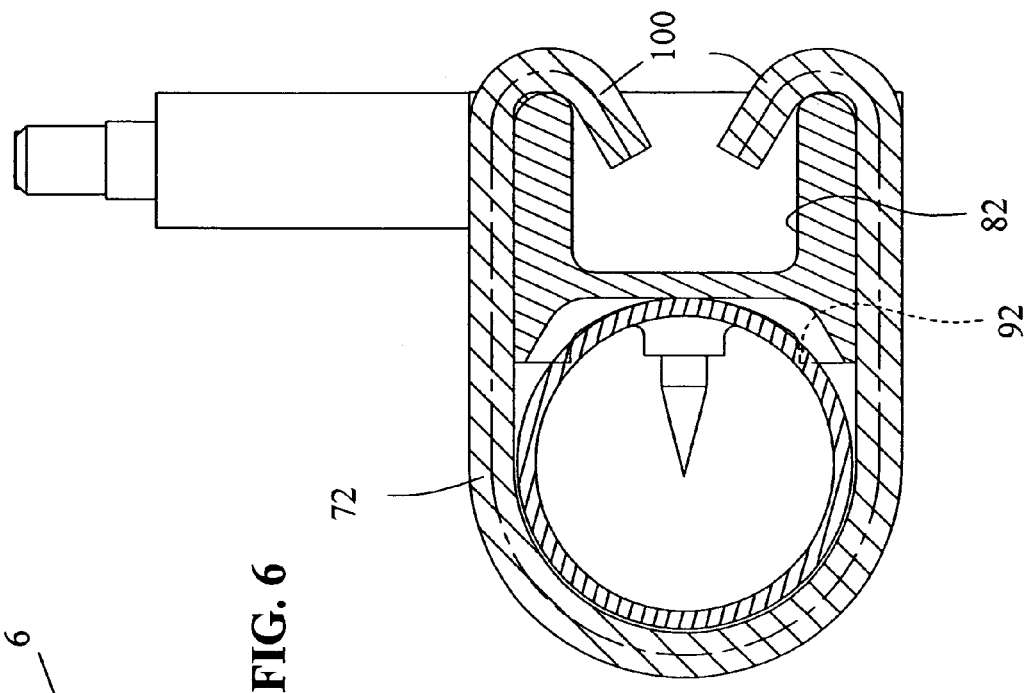
FIG. 7 is a cross-section view through lines 7-7 of FIG. 4.

As shown first in FIG. 3, the pivot mechanism 8 includes a cast housing portion 70, which is retained to the tubular component 6 by way of retaining clips or clamps 72, and prevented from rotating by piercing pins 74 (FIG. 6). As shown best in FIGS. 3, 4 and 5, housing 70 includes a flange portion 76 and a pin mounting portion 78. The flange portion 76 is generally rectangular in configuration and includes a top face 80 having recesses 82 and apertures 84. The bearing section 86 extends transversely to the length of the housing 70, and includes a bearing sleeve or bushing 88 press fit within the bearing section 86. The face opposite the top face 80 is a confronting face 90 (FIG. 6) having a generally semi-cylindrical configuration. The face has longitudinally extending ridges 92, which form gripping edges which "bite" into the tubular section 6 (FIG. 7). The housing 70 further includes a sleeve section 96 to receive a pantograph post 98.

Finally, clips 72 and pins 74 will be described in greater detail. The clamps are formed from heavy wire and are formed around the housing 70, with ends 100 crimped into recesses 82. This retains the housing 70 to the tubular component 6. Pins 74 may now be driven down into aperture 84, and through tubular component 6, as best shown in FIG. 6. This prevents (along with ridges 92) the twisting of the housings 70 relative to the tubular component 6. With all of the components as described above, the assembly of the unit will now be described.

As mentioned above, the tubular component will be formed as required for the application. It should be appreciated that various and multiple configurations are possible, and that the tubular components can be formed in a typical fashion with a tube bender. Thereafter the motor 12 is mounted to its bracket 58, whereupon linkage 14 can be positioned to motor 12 by way of fastener 60. The linkage 14 can also be fastened at its opposite end to yoke 18, whereupon pivot member 10 can be located along the length of tube sections 40, and held temporarily. Link 16 is fixed at both ends, at one end by fastener member 62, and at the opposite end by a fastener to lever 22. This allows the pivot member 8 to be located along its corresponding section of tube 38. Once the pivot members 8, 10 are in their appropriate locations, then the clamp sections 72 can be applied as described above, with the ends 100 crimped into apertures 82. The pins 74 are then driven into the tubes 6, to the position shown in FIG. 6. The assembly can then be applied as a unit, and installed into an automotive application.

It should be appreciated that the above-described assembly has numerous advantages. Firstly, the overall assembly is more rigid, as the tubular component never needs to be severed. As mentioned above, where units are plugged into the ends of tubes, the tubes would be cut in several places, then the pivot members are clinched to the tube ends. Secondly, as the identical unit can be positioned in place, then lower inventory is required for such units, and the cost of producing them also drops. Finally, the overall cost is reduced as the assembly process is simplified.

What is claimed is:

1. A windshield wiper assembly, comprising:
   at least one elongate tubular frame member, and
   a plurality of pivot mechanisms, each pivot mechanism having
      a flange portion having an open surface for mounting to an exterior surface of the tubular frame member and a pin mounting portion, and a retaining assembly for retaining the pivot mechanisms to the tubular frame member;

wherein said open surface is arcuate in cross section to substantially conform to the outside diameter of the elongate tubular frame member; and wherein said retaining assembly is comprised of at least one clip portion which surrounds said elongate tubular frame member and said pivot mechanism, retaining them together.

2. The windshield wiper assembly of claim 1, wherein said retaining assembly is comprised of two clip portions, which flank said pin mounting portion, and which circumscribe the combination of said elongate tubular frame member and said pivot mechanism.

3. The windshield wiper assembly of claim 2, wherein said pivot mechanism, on a face opposite said arcuate open surface, has indentations, and said two clip portions have free ends which are crimped into said indentations.

4. The windshield wiper assembly of claim 3, further comprising piercing pins extending through said flange portion and extend into said elongate tubular frame member.

5. The windshield wiper assembly of claim 4, wherein said elongate tubular frame member includes mounting members to mount said assembly.

6. The windshield wiper assembly of claim 5, wherein said mounting members are defined by a portion of said elongate tubular frame member, flattened and formed with an aperture therethrough.

\* \* \* \* \*